United States Patent
Hake et al.

(10) Patent No.: US 6,934,531 B1
(45) Date of Patent: Aug. 23, 2005

(54) METHOD FOR IMPROVING THE SECURITY OF AUTHENTICATION PROCEDURES IN DIGITAL MOBILE RADIO TELEPHONE SYSTEMS

(75) Inventors: Jens Hake, Kemtau (DE); Jörg Thelen, Bonn (DE)

(73) Assignee: T-Mobile Deutschland GmbH, Bonn (DE)

( * ) Notice: Subject to any disclaimer, the term of this patent is extended or adjusted under 35 U.S.C. 154(b) by 0 days.

(21) Appl. No.: 09/786,164

(22) PCT Filed: Sep. 7, 1999

(86) PCT No.: PCT/DE99/02836

§ 371 (c)(1),
(2), (4) Date: May 24, 2001

(87) PCT Pub. No.: WO00/14895

PCT Pub. Date: Mar. 16, 2000

(30) Foreign Application Priority Data

Sep. 7, 1998 (DE) .................................. 198 40 742

(51) Int. Cl.$^7$ .......................... H04M 1/66; H04M 1/68; H04M 3/16
(52) U.S. Cl. ...................... 455/410; 455/411; 455/558; 380/277
(58) Field of Search ........................ 455/410, 411, 558; 380/277; 713/169

(56) References Cited

U.S. PATENT DOCUMENTS

| 5,596,641 A | * | 1/1997 | Ohashi et al. | 380/248 |
| 5,661,806 A | | 8/1997 | Nevoux et al. | |
| 5,887,251 A | * | 3/1999 | Fehnel | 455/411 |
| 6,009,174 A | * | 12/1999 | Tatebayashi et al. | 380/277 |
| 6,058,477 A | * | 5/2000 | Kusakabe et al. | 713/169 |
| 6,665,529 B1 | * | 12/2003 | Mills, Jr. | 455/411 |

FOREIGN PATENT DOCUMENTS

| EP | 0 506 637 A2 | 9/1992 |
| EP | 0 653 895 A2 | 5/1995 |

OTHER PUBLICATIONS

PCT Search Report mailed Apr. 17, 2000 corresponding to PCT/DE99/02836.

* cited by examiner

*Primary Examiner*—Temica M. Beamer
(74) *Attorney, Agent, or Firm*—John M. Harrington; Kilpatrick Stockton LLP

(57) ABSTRACT

The invention relates to a method for improving the security of authentication procedures in digital mobile radio telephone systems. In order to make it more difficult if not impossible to work out a secret code KI, several different secret SIM-specific codes KI are contained in the mobile radio telephone network and on a subscriber identity module SIM and a code KI for the implementation of said authentication is selected from the various secret codes thus contained during the authentication process between the subscriber identity module and the mobile radio telephone system pertaining to said SIM.

5 Claims, 1 Drawing Sheet

Figure 1:
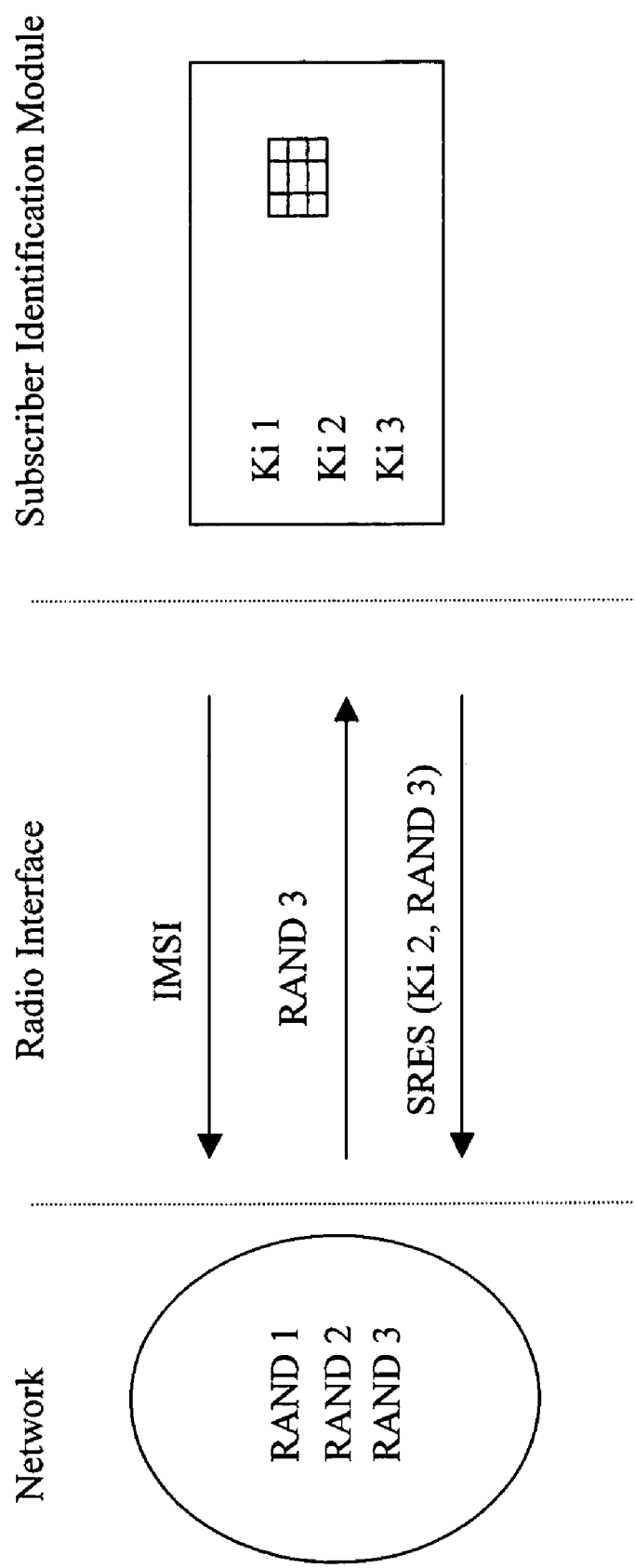

METHOD FOR IMPROVING THE SECURITY OF AUTHENTICATION PROCEDURES IN DIGITAL MOBILE RADIO TELEPHONE SYSTEMS

The invention concerns a procedure for the increased security of authentication processes for digital mobile radio system, according to the characterizing clause of patent claim 1. The present application is a continuation of PCT/DE99/02836 which was filed on Sep. 7, 1999.

Modern mobile radio networks have special security features and precautions, which prevent unauthorized use of operating equipment or resources by anyone other than authorized persons and protects against possible eavesdropping or tapping of radio operations. The security measures refer, therefore, to the protection of the relationship between the mobile radio network and the authorized user. A special procedure for authorizing the user will prevent a third party from stealing the authorized user's identity. By comparing his subscriber identification module with the stored data and functions in the mobile radio network, a user must be authenticated. In the past, it has been shown over and over that authentication processes can be compromised (i.e. spying on the subscriber's secret code KI) with specialized knowledge and the right equipment, and that this is possible by sequencing random numbers and response numbers (that is, RAND/SRES pairs) that can be subjected in larger quantities to mathematical procedures, in order to determine the secret code KI of a user. Once the secret code KI has been determined, an illegal duplication of the subscriber's identification module is possible.

With the authentication processes currently being used, the mobile radio network uses special algorithms and a SIM-specific secret code KI from a random value RAND for an authentication result SRES and a temporary code KC. In this way, the mobile radio network has a certain number of RAND/SRES/KC-triplets. If a user want to sign in, the mobile radio network transmits a random number RAND to the subscriber's identification module SIM. The SIM determines, with the same special algorithms and its SIM-specific secret code KI, a corresponding SRES/KC-pair and send the determined SRES back to the mobile radio network. The mobile radio network compares the received SRES with the previously held SRES to see if they conform so that a match authenticates the subscriber. The code KC is calculated and evaluated on both sides to encode the transmission.

As previously stated, with the procedures currently being used, it is possible to compromise or spy on the code KI in order to gain unauthorized access to the mobile radio network.

The present invention is based on the task of improving the security of the authentication procedures of digital mobile radio systems, which make it nearly impossible to discover the secret codes.

The characterizing features in patent claim 1 solve the task.

The invention is based, thus, on the fact that there are several various secret SIM-specific codes KI stored in the subscriber's identification module in the mobile radio network and selects a code from several pre-held secret codes for the completion of the authentication between the subscriber's identification module and the mobile radio network.

The advantage of this procedure is based on the fact that a compromise (i.e. spying or ferreting out the secret code KI) of the SIM is made substantially more difficult because it is not foreseeable nor discernable to the "aggressor" or "attacker" which secret code KI of the SIM is being used to calculate the SRES answer.

Another essential advantage of this procedure is that a modification to the (interface) operations of the mobile radio network, in particular the air operations (interface) is not necessary. Likewise, no modification at the terminals or end equipment must be made. Only local software-technical modifications at individual network components of the mobile radio network, as well as on the SIM, are necessary and these are feasible without hardly any costs and very little expenditure.

Advantageously, the selection of used codes KI result from the SIM according to the random principle.

In a preferred embodiment, the mobile radio network determines with special algorithms under specifications, respectively, a SRES/KC-pair from random number RAND for all SIM-specific codes KI of a user, and forms the so-called RAND/SRES/KC-triplets with the respectively used RAND. The triplet is held in the mobile radio network and can be called upon for future authentication procedures.

For starting up an authentication, the mobile radio network transmits a random value RAND of one of these triplets to the subscriber identification module SIM, and then, the subscriber identification module selects an available code on the basis of the transmitted RAND and calculates the appropriate values for the SRES response and the code KC on the basis of this selected code KI and sends back the SRES response to the mobile radio network.

In the mobile radio network, a comparison now takes place to determine the conformity or matching of the received response SRES to all the SRES values held for the used RAND so that if a match is met between the responses SRES (returned from the SIM) and a SRES (stored in the mobile radio network), the user's authentication is validated.

Preferably, the mobile radio network will now use the corresponding SRES belonging to the KC to encode the transfer or transmission so that the identical code KC is available in the SIM and is also used for the encoding of the transmission.

Subsequently, an embodiment of the invention is explained more closely in a drawing representation. Further characteristics, features and advantages of the invention are shown in the drawing and corresponding description.

FIG. 1 shows an authentication procedure in a simplified representation according to the invention. In order to complete the procedure, several secret codes KI must be stored for each user in the mobile radio network and, also, in the subscriber identification module.

| Mobile radio network: User X | | | |
|---|---|---|---|
| | KI 1 | KI 2 | KI 3 |
| RAND 1 | SRES/KC (1,1) | SRES/KC (1,2) | SRES/KC (1,3) |
| RAND 2 | SRES/KC (2,1) | SRES/KC (2,2) | SRES/KC (2,3) |
| RAND 3 | SRES/KC (3,1) | SRES/KC (3,2) | SRES/KC (3,3) |
| ... | ... | ... | ... |

As shown in the table above, for example, three secret codes KI are set aside in the mobile radio network for each subscriber X so that now the mobile radio network has settings of several random numbers RAND 1, RAND 2 and RAND 3 and, in each case, secret codes KI 1, KI 2 and KI 3 that calculate and store corresponding SRES responses and codes KC.

Also in the subscriber identification module for the subscriber or user X, three possible codes KI 1, KI 2 and KI 3 are set aside.

If the user want to check into the mobile radio network, the authentication procedures must first be completed, as is shown in FIG. 1. The subscriber identification module first transmits the subscriber identity number IMSI over an appropriate terminal or end device to the mobile radio network. If this IMSI is recognized as admissible, then the mobile radio network chooses a random value from a stored random value RAND for the user X (here, for example, RAND 3) and sends this back to the subscriber identification module. The subscriber identification module selects again one of the user specific secret codes KI (for example, KI 2) and from the RAND 3 and the KI 2, calculates the corresponding SRES response and the code KC received by the mobile radio network. The SRES response, that was formed from the code KI 2 and the RAND 3, is transmitted back to the mobile radio network and compared with the stored SRES value to KI 2 and RAND 3. If these SRES values correspond, then the user is considered authenticated and can check into mobile radio network. The available codes KC are utilized on both sides during the newly-made connection to encode the data communication.

What is claimed is:

1. Procedure for the increased security of authentication processes in digital mobile radio systems, comprising:
    storing several different secret SIM-specific keys (KI) in a mobile radio network and in a subscriber identification module (SIM);
    pre-configuring and storing a RAND/SRES/KC authentication triplet for each one of the several secret keys (KI) stored in the mobile radio network;
    selecting and sending a random value RAND of one of the pre-configured authentication triplets to the subscriber identification module (SIM) by the mobile radio network;
    selecting one of the secret keys (KI) stored in the subscriber identification module (SIM) and calculating from the random value RAND and the selected one of the secret keys (KI) a corresponding value for a signed response (SRES) and cipher key (KC) and sending the calculated values to the mobile radio network by the subscriber identification module (SIM); and
    comparing the signed response (SRES) to all SRES values for the random value RAND by the mobile radio network and validating the subscriber's authentication if a match is found.

2. Procedure, according to claim 1, further comprising randomly selecting said one of the secret keys (KI) stored in the subscriber identification module (SIM) by the subscriber identification module (SIM).

3. Procedure, according to claim 1, wherein pre-configuring and storing said RAND/SRES/KC authentication triplet for each of said several different secret keys (KI) further comprises passing a random number (RAND) and each of said secret keys (KI) through a plurality of pre-determined algorithms to determine a SRES/KC-pair for each of the SIM-specific keys (KI) forming, with the respective RAND, RAND/SRES/KC-triplets.

4. Procedure, according to claim 3, wherein the subscriber identification module (SIM) calculates the corresponding values for signed response SRES and cipher key KC from the transmitted random value RAND and the selected key (KI) using its copies of the pre-determined algorithms, and sends the determined answer to the mobile radio network.

5. Procedure, according to claim 1, is characterized further comprising encrypting a transmission by the mobile radio network and the SIM using the cipher key KC.

* * * * *